May 24, 1955 J. Q. ADAMS 2,708,901
PIG CREEP FEEDER
Filed Nov. 25, 1953 2 Sheets-Sheet 1
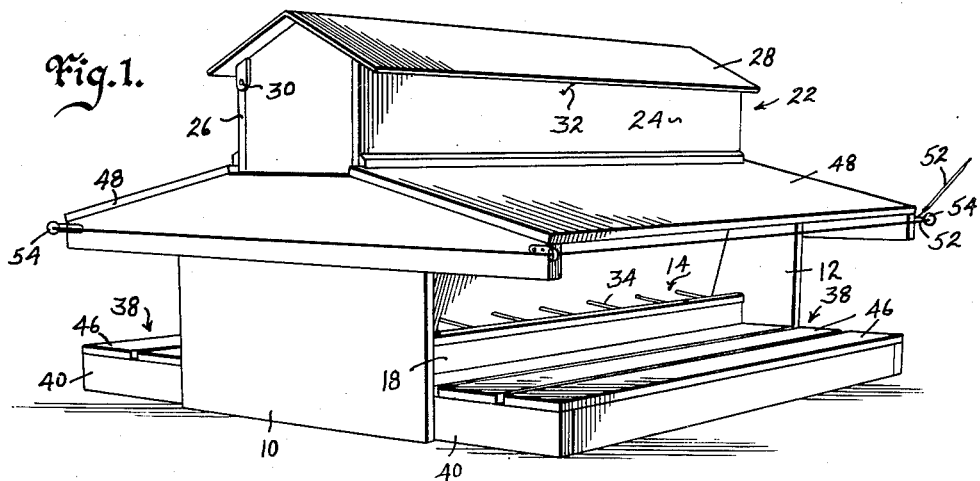
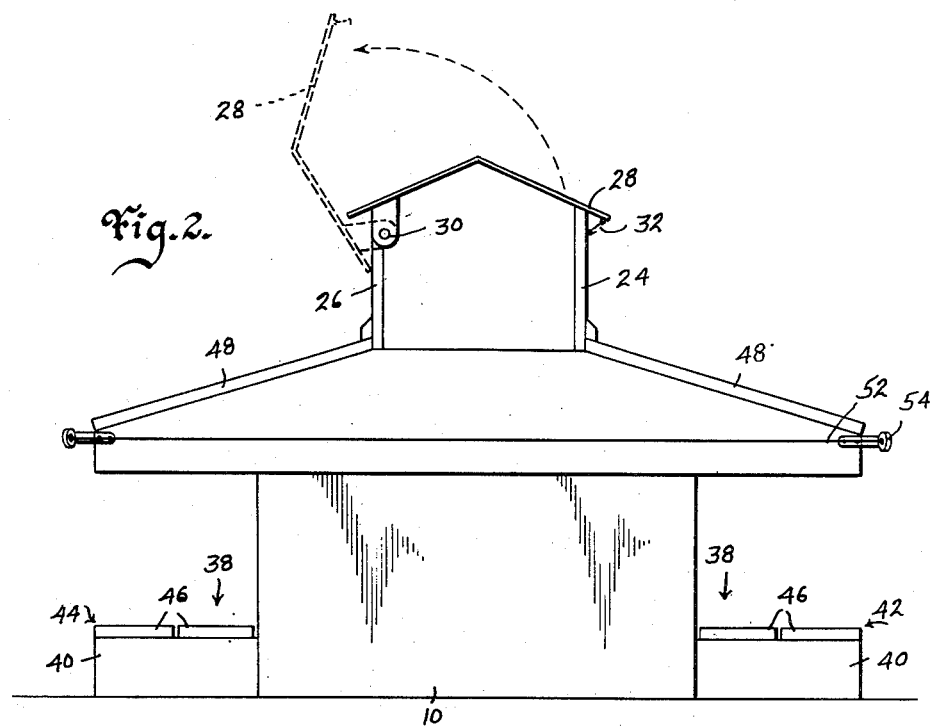
Inventor
John Q. Adams
by Talbert Dick & Adler
Attorneys
Witness
Edward P. Seeley

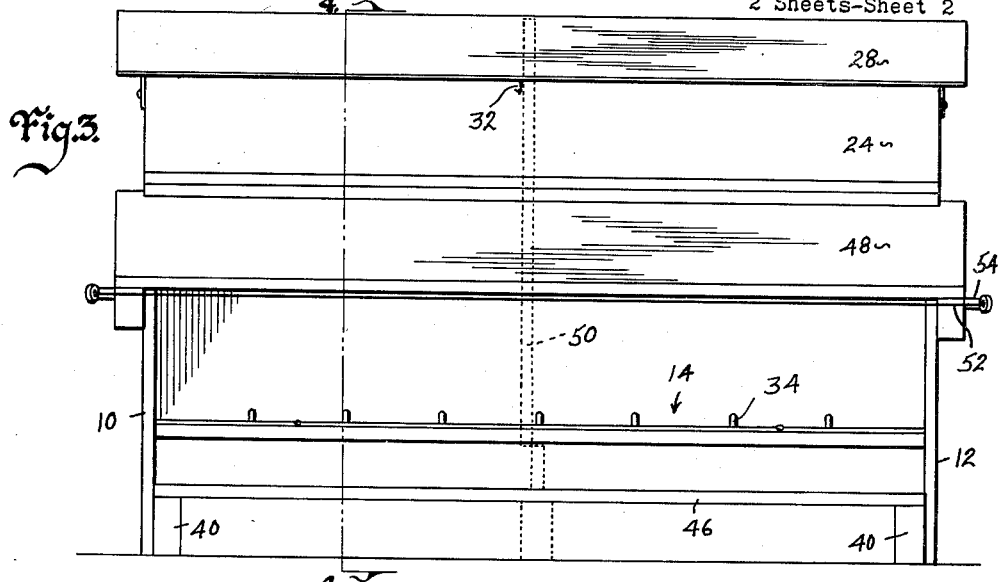
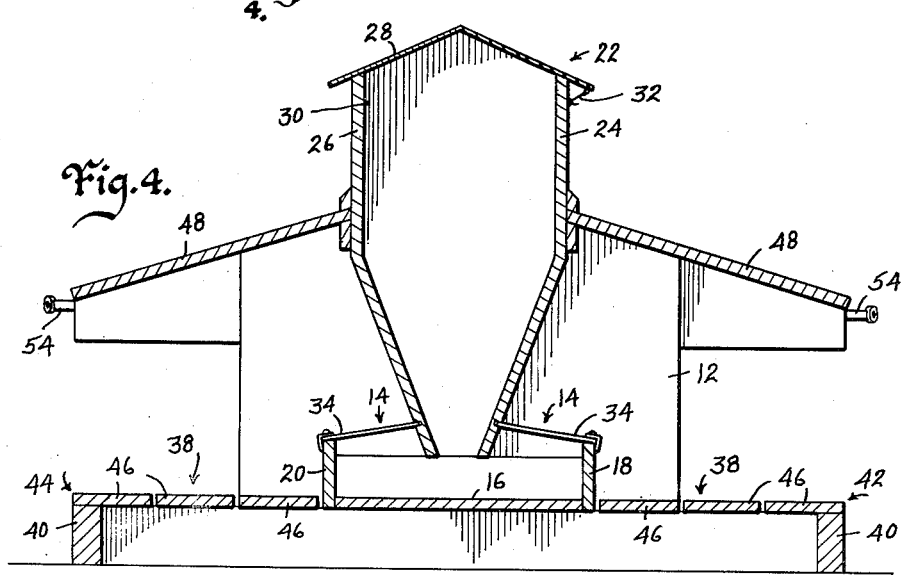

United States Patent Office 2,708,901
Patented May 24, 1955

2,708,901

PIG CREEP FEEDER

John Q. Adams, Clark, Mo.

Application November 25, 1953, Serial No. 394,317

6 Claims. (Cl. 119—52)

My invention relates to the art of feeding pigs and the term pigs as used herein relates to the young and small swine under sixty (60) pounds, for example, as distinguished from the older and more mature swine generally referred to as hogs.

More particularly this invention is concerned with a feeding unit so designed that pigs can easily feed therefrom while hogs are unable to gain access thereto. This is an extremely important consideration in the feeding of pigs for otherwise the special food placed for pigs will be consumed by the hogs. It is, of course, possible to segregate the pigs and hogs or to provide small feed houses into which only the pigs can enter but this obviously requires additional expense and in the case of segregation requires the necessary area. In some instances, however, the practice appears to be to build small enclosures within the swine area in which the pigs can feed which consist of several stakes driven into the ground to support some wire fencing. These must be moved from time to time and the time required for setting them up and taking them down are important to a busy farmer. As a result, many swine raisers do not adequately protect the pigs from encroachment by the hogs on their feed with the result that full benefits from the pig feed is not obtained.

Another object of my invention is to provide a pig creep feeder for the purpose above set out that can be easily moved from place to place and is ready for use at any time.

A still further object of this invention is to provide a pig feeder of the above which is designed so that the feeding pigs need not stand in the mud or dirt and are protected along with the feed from rain and the like.

Another object of this invention is to provide the pig feeder described with means for discouraging the efforts of hogs to obtain feed therefrom.

Still another object of my invention is to provide a pig creep feeder of the above class that cannot be tipped or tilted either by the pigs or hogs.

These and other objects will be apparent to those skilled in the art.

My invention consists in the construction, arrangement, and combination of the various parts of the device, whereby the objects contemplated are attained as hereinafter more fully set forth, specifically pointed out in my calims, and illustrated in the accompanying drawings, in which:

Fig. 1 is a perspective view of a pig creep feeder illustrating a preferred embodiment of my invention, Fig. 2 is an end elevational view of the feeder shown in Fig. 1, Fig. 3 is an enlarged side view of this feeder, and Fig. 4 is a cross sectional view taken on the line 4—4 of Fig. 3.

Referring to the drawings my feeder unit might be described generally as a feeding house as illustrated in Fig. 1. It consists of the end members 10 and 12 between which extends the feed bin or chamber 14 formed by the floor 16 and sides 18 and 20 and it will be observed in Fig. 4 that the width of chamber 14 is less than of sides 10 and 12 and is substantially centrally arranged so that the sides 18 and 20 are set in from the respective outer edges of members 10 and 12. A feed supply chute 22, coextensive in length with the distance between ends 10 and 12 and chamber 14, has the upper parallel spaced apart sides 24 and 26 that converge toward but not to each other at their lower ends (Fig. 4) to terminate within chamber 14 so as to bisect it longitudinally and provide feeding areas on opposite sides thereof as illustrated in Fig. 4. The height of chamber 14 is such that the major upper portion of sides 24 and 26 extend above the top of ends 10 and 12.

A gabled roof 28 serves as a cover for chute 22 and is hingedly connected to one of the chute sides as at 30 so as to open as illustrated in Fig. 2. Hook means 32 may be employed to secure the roof 28 for obvious reasons. Extending transversely of feed chamber sides 18 and 12 and the respective sides 24 and 26 of chute 24 are the partitions or separators 34 which are spaced laterally from each other to provide separate feeding stalls or areas. A feeding platform 38 off of the ground and on the same level as floor 16 extends outwardly from each side of chute 22 beyond the outer edges of sides 10 and 12 and is suitably supported by the frame 40. In this connection it is pointed out that the distance between the points 42 and 44 (Fig. 4) is such that an adequate and stable support is provided for the entire structure of this feeder so as to eliminate any danger of its being tipped or upset as will later appear. Preferably platform 38 consists of several planks 46 arranged in spaced realtionship to allow drainage of urine or the like deposited thereon while the pigs are feeding.

A roof or canopy 48 is mounted so as to cover each of the feed chambers 14 and platforms 38 and extends from each side of chute 22 at a point approximately at the height of ends 10 and 12 downwardly and outwardly to terminate in spaced relationship above the outer edges of the feeding platforms 38. This vertical distance between the free ends of canopy 48 and platforms 38 is calculated to provide easy access therethrough for pigs that will feed in chamber 14 but to serve as a barrier for preventing the entrance of hogs. It is, therefore, possible to place my feeder in any pen or enclosure that may contain both pigs and hogs with full assurance that the special feed required for the pigs will be available to them and cannot be eaten by the hogs. This feeder is complete as a unit and no special or extra precautions are required to keep the hogs out. It may be moved with comparative ease without dismantling or setting up any parts.

A partition 50 may be used in chute 22 if desired so that different types of feed can be used without mixing. Also a wire 52, electrically charged to produce a slight shock without injury may be arranged to extend from the free edges of the canopy 48 by suitable supports 54 so that it would be contacted by a hog approaching the feeder thus deter it from further efforts in that direction. However, even though a hog might get its snout under canopy 48, the feed chamber 14 is far enough in so as to be out of reach since the narrowness of the opening between platform 38 and the canopy will not permit it to enter. In this position a hog may attempt to upset the feeder but the broad platform base above described serves to keep the feeder in upright position against such attempts.

It is submitted that the invention shown and described is aptly suited to achieve the purposes intended and is characterized by a combination of highly useful and mutually cooperating elements that combine their respective and proportionate functions in accomplishing the objects sought to be obtained.

Some changes may be made in the construction and arrangement of my pig creep feeder without departing from the real spirit and purpose of my invention, and it is my intention to cover by my claims, any modified forms of structure or use of mechanical equivalents which may be reasonably included within their scope.

I claim:

1. A pig feeder unit comprising a horizontally disposed platform, end members extending upwardly from opposite ends of said platform, an elongated feed chamber arranged on the central portion of said platform and extending between said end members, a vertically disposed feed chute extending between said end members above said feed chamber so as to partition the latter into two oppositely facing feeding areas, said platform extending beyond opposite sides of said end members sufficiently to support the pigs feeding from said feeding areas, and a canopy extending outwardly and downwardly from opposite sides of said feed chute a distance sufficient to cover the feeding pigs supported on said platform, said canopy being supported by said end members in cantilever fashion so as to leave the pig supporting areas of said platform free from vertical supports which tend to retard the movement of pigs thereon, the outer edges of said canopy being spaced vertically from said platform a distance sufficient to permit the entry and exit of pigs to said feeding areas but to deny the entry of hogs thereto whereby the pigs on said platform may feed from said feeding areas protected from being molested by the hogs.

2. A pig feeder unit as defined in claim 1 including an electrically charged wire projecting from the outer edges of said canopy, said wire being charged to produce shock without injury to any animal contacting the same.

3. A pig feeder unit as defined in claim 1 wherein the upper end of said chute extends above said canopy and is closed by a roof.

4. A pig feeder unit as defined in claim 3 wherein said roof is pivoted to the upper end of said feed chute.

5. A pig feeder unit as defined in claim 1 wherein said platform comprises spaced ground engaging members extending transversely of said feed chamber, and closely spaced longitudinal plank members mounted on said ground engaging members for supporting the feeding pigs.

6. A pig feeder unit as defined in claim 1 wherein said feed chamber comprises a trough mounted on said platform.

References Cited in the file of this patent

UNITED STATES PATENTS

| Number | Name | Date |
|---|---|---|
| 608,863 | Innis | Aug. 9, 1898 |
| 1,114,482 | Johnson | Oct. 20, 1914 |
| 1,121,502 | Hornbeck | Dec. 15, 1914 |
| 1,257,399 | Robbins | Feb. 26, 1918 |
| 1,333,787 | Winters | Mar. 16, 1920 |
| 1,437,462 | Belvel | Dec. 5, 1922 |
| 1,468,205 | Julian | Sept. 18, 1923 |
| 1,502,171 | Booth | July 22, 1924 |
| 1,719,245 | Smidley | July 2, 1929 |
| 1,755,532 | Bernard et al. | Apr. 22, 1930 |
| 1,895,435 | Ahrens | Jan. 31, 1933 |
| 2,273,616 | Beatty | Feb. 17, 1942 |
| 2,376,630 | Stentz | May 22, 1945 |
| 2,408,477 | Payne | Oct. 1, 1946 |
| 2,660,149 | Jolly | Nov. 24, 1953 |